May 9, 1967

E. L. WALTERS 3,318,674

APPARATUS FOR PROTECTING THE WITHDRAWING ROLLERS
OF A MOLTEN METAL BATH IN A GLASS
SHEET MAKING OPERATION

Filed April 29, 1964

INVENTOR.
Emmett L. Walters
BY
Nobbe & Swope
ATTORNEYS

INVENTOR.
Emmett L. Walters
BY
Nobbe & Swope
ATTORNEYS

United States Patent Office 3,318,674
Patented May 9, 1967

3,318,674
APPARATUS FOR PROTECTING THE WITHDRAWING ROLLERS OF A MOLTEN METAL BATH IN A GLASS SHEET MAKING OPERATION
Emmett L. Walters, Toledo, Ohio, assignor to Libbey-Owens-Ford Glass Company
Filed Apr. 29, 1964, Ser. No. 363,383
5 Claims. (Cl. 65—159)

The present invention relates broadly to supporting and conveying sheet material and more particularly to the supporting of a continuously moving ribbon of glass by auxiliary means in areas and during periods when it is desired to protect the regular conveying means.

According to a preferred embodiment of the invention, a portion of the length of a continuously moving, newly formed ribbon of glass is supported out of contact with its regular conveying means and subsequently returned thereto, without breaking said ribbon or interrupting its continuous movement, by the temporary interposition of auxiliary supporting means.

In this form, the present invention is particularly valuable in connection with the so-called "float" process of producing flat glass as described in U.S. Patent 3,083,551, granted April 2, 1963. In such a "float" process, glass (either in ribbon form or in the molten state) is delivered at a controlled rate onto a bath of molten metal and advanced along the surface of the bath under thermal and mechanical conditions which assure (1) that a layer of molten glass that is free to flow laterally is established on the metal bath and (2) that from this molten layer there will develop on the surface of the metal bath a buoyant body of molten glass of stable thickness. As this body of stable thickness develops, it is continuously advanced, in ribbon form, along the bath and sufficiently cooled to permit its being taken unharmed from the bath by mechanical means.

One practical application of the present invention has to do with the mechanical means by which the "float" glass ribbon is removed from the surface of the bath of molten metal and advanced toward the conventional annealing lehr or oven.

In this connection it is an important object of the invention to direct a moving ribbon of glass that is being continuously removed from a molten metal bath out of the normal path of travel thereof and into a different path for a predetermined distance and for a predetermined length of time and to thereafter return the ribbon to the normal path.

Another object is to direct a glass ribbon in this way for a sufficient distance and for a sufficient length of time to protect the regular conveying means, which define the normal path of the ribbon, from the injurious effects of starting a new ribbon thereover or of the temporary production of bad undersurface.

Another object is the provision of auxiliary supporting means, associated with the regular conveying means for a continuously moving glass ribbon, that is movable relative to the regular conveying means in a manner to take over the support of a length of the ribbon therefrom and to subsequently return it thereto.

Other objects and advantages of the invention will become more apparent during the course of the following description, when taken in connection with the accompanying drawings.

In the drawings, wherein like numerals are employed to designate like parts throughout the same:

Referring now more particularly to the drawings, there has been illustrated therein that form of float glass apparatus described in U.S. Patent 3,083,551 in which glass is delivered in ribbon form onto the bath of molten metal.

Figure 1:
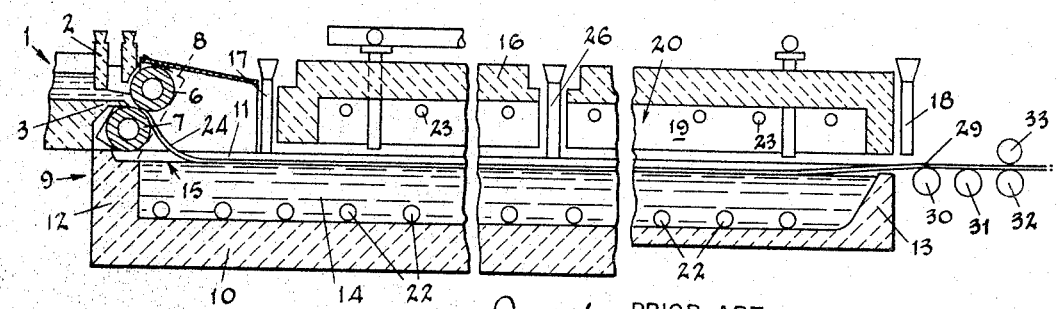
FIG. 1 is a fragmentary, longitudinal, vertical, sectional view through one form of continuous tank furnace for producing flat glass by the float process and showing the regular conveying means for the glass ribbon at the discharge end of the furnace.

As best shown in FIG. 1, this includes a forehearth of a continuous glass melting tank indicated at 1, a regulating tweel 2 and spout 3. Operatively associated with the spout 3 are a pair of water-cooled casting rolls, the upper of which is indicated at 6 and the lower at 7, mounted in frames 8 and driven in a usual manner.

The conventional ribbon forming means just described may be disposed over a tank 9 which includes a floor 10, side walls 11 and end walls 12 and 13 confining a bath 14 of molten metal, such as tin, the level of the surface of which is indicated at 15.

The tank 9 supports an overhead structure including a roof 16, vertically adjustable end walls 17 and 18 and side walls 19 providing a tunnel over the molten metal bath 14 and defining a headspace 20.

The temperature of the molten metal bath in the tank is regulated from the inlet end to the discharge end by providing thermal regulators, indicated at 22, immersed in the molten metal. The headspace 20 over the bath is preferably heated by radiant heat directed downwardly from heaters 23 mounted in the roof.

In operation, a ribbon of glass 24 which is of lesser width and greater thickness than the ultimate ribbon to be produced, is fed onto the surface 15 of the bath of molten metal 14.

The thermal regulators 22 and 23 at the entry end of the apparatus (between the end wall 17 and a tweel 26) are operated to maintain a temperature of about 1,000° C. or slightly higher whereby to transform the ribbon 24 into a buoyant layer of molten glass 27 from which is developed a buoyant body 28 of molten glass of stable thickness.

By predetermining the dimensions of the ribbon 24 fed to the bath from between the casting rolls 6 and 7, and with the rate of rolling onto the bath being substantially equal to the rate of discharge therefrom, the buoyant body of molten glass of stable thickness 28 is constantly maintained. In this connection the width of the molten metal bath 14 is such that the walls 11 of the tank are at every point spaced from the glass on the bath so that the surface of the molten metal is exposed on each side of the edges of the ribbon 24, of the layer of molten glass 27 formed therefrom, and of the body 28 of stable thickness developed from the layer 27. Therefore, the buoyant molten glass in the layer 27 is free to progressively flow across the bath to develop the body 28 of stable thickness, with the body of stable thickness being fully developed when equilibrium has been established, or substantially so, between the forces of surface tension of the molten glass and the molten metal, and the forces of gravity.

The thermal regulators in the roof and tank structures disposed between the tweel 26 and the end wall 18 are controlled so that the body of molten glass of stable thickness, in ribbon form 29 which has passed under the tweel 26 is progressively cooled from there to the discharge end. For example, a suitable temperature gradient of descending values is achieved when the temperature of the bath up to the tweel 26 is about 1,000° C. and, beyond the tweel 26, descends first to 825° C. and then further to a temperature at which the ribbon surface is sufficiently stiffened to allow its transfer to a lehr on proper mechanical conveying means, e.g. a temperature (about 650° C.) at which the viscosity is about $10^7$ poises.

To remove the ribbon from the molten metal bath, there is mounted, outside of the discharge end of the tank, mechanical receiving and conveying means exemplified by supporting rollers 30 to 32 and superimposed roller 33. Any or all of the rollers 30 to 33 may be driven and co-operate to apply a tractive effort to the ribbon of glass moving towards the outlet, which tractive effort also assists in advancing the glass along the bath.

An important feature of the so-called "float" process as above described is that the flat glass produced thereby is of uniform thickness and substantially free of surface distortions, even though it has been neither ground nor polished. In addition the float glass has a natural luster similar to that known as "fire finish."

However these distinctive advantages of the float process also present problems due to the fact that float glass is at the peak of its quality as it leaves the molten metal bath but, at this time, is at a temperature around, if not appreciably above 1,000° F. Consequently its surfaces, and particularly its undersurface, are relatively soft and therefore especially susceptible to marring of the finish and/or the creation of surface defects by mechanical contact.

For this reason it is important that the conveying means adjacent the point where the glass ribbon 29 leaves the molten bath 14 be as clean and free from imperfections as it is possible to keep them. At the same time it is equally important that the operation of the furnace and the continuous taking of the ribbon from the molten metal bath not be interrupted since any such interruption or breaking of the ribbon will result in a very considerable loss of time and materials before continuous operation on a production basis can be resumed.

The present invention makes these things possible by protecting the surfaces of the withdrawing and conveying elements that first contact the soft glass ribbon after it leaves the molten metal bath during certain periods which occur in the normal operation of a float glass apparatus and during which such surfaces would otherwise be subjected to conditions that might injure or contaminate them.

This protection is provided, according to the invention, by movable covers, plates or the like which are adapted to be interposed between the regular conveying surfaces and the glass ribbon and, in this position, act both as protective means for the conveyor surfaces and as temporary supporting means for the ribbon. In this way the apparatus of the invention acts to prevent contamination of or injury to the regular conveyor surfaces while at the same time taking over the support of the glass ribbon so that its removal from the molten metal bath will not be interrupted nor its continuity broken.

Figure 2:
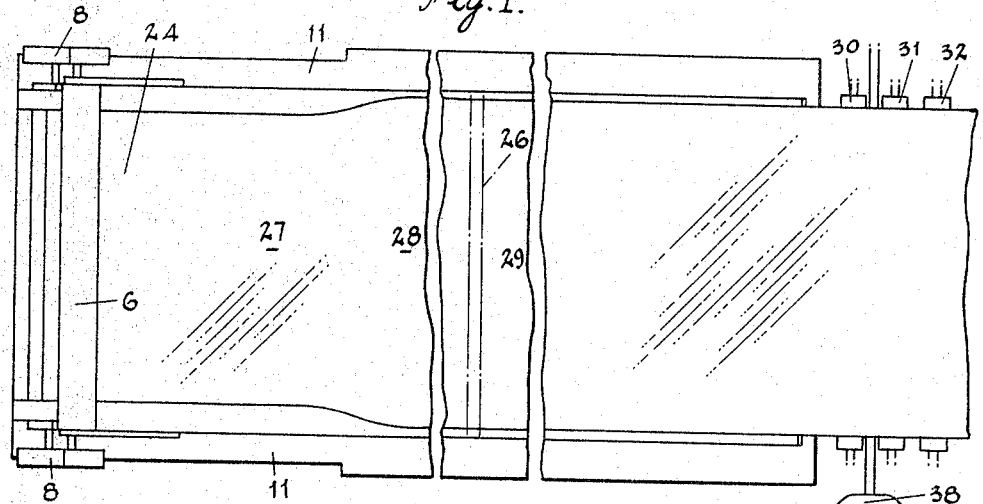
FIG. 2 is a plan view of the structure shown in FIG. 1 but showing one form of auxiliary supporting means associated with the regular conveyor means.
Figure 3:
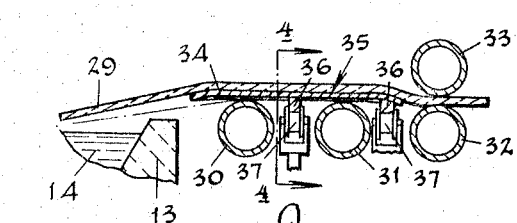
FIG. 3 is a longitudinal, sectional view on an enlarged scale of the discharge end of the furnace of FIG. 1 with the associated auxiliary supporting means in operative position.
Figure 4:
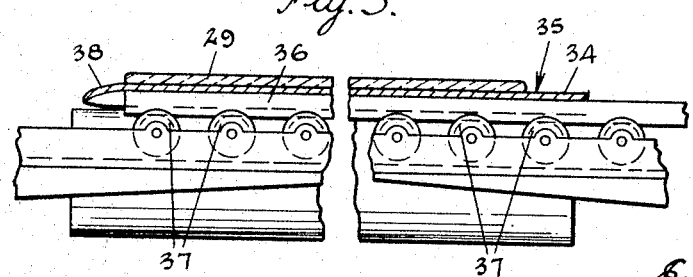
FIG. 4 is a fragmentary, sectional view taken substantially along the line 4—4 in FIG. 3 showing one form of mounting for the auxiliary supporting means shown in FIGS. 2 and 3.

By way of illustration a preferred form of the apparatus of the invention has been indicated in FIGS. 2 to 4 of the drawings and is there shown as associated with the conventional conveyor rolls 30 and 31 which are usually termed the "lift" rolls, being mounted in a horizontal plane and with their upper surfaces slightly higher than the end wall 13 of the tank 9 so that during normal operations (broken lines in FIG. 3) the ribbon 29 is lifted from the molten metal bath 14 onto the first roll 30 and is conveyed in a generally horizontal direction over roll 31 and between rolls 32 and 33 toward an annealing lehr (not shown).

One normal occurrence in the operation of a float glass furnace that is apt to set up conditions that might injure or contaminate the surfaces of the lift rolls 30 and 31 is the starting of a new ribbon. This occurs when a furnace is started up for the first time or after a repair or rebuild or when the ribbon has been "lost" for some reason.

At such a time there will of course be a body of glass 28 of stable thickness that has developed from the buoyant layer of molten glass 27 on top of the molten metal bath 14 and the body of stable thickness will have assumed ribbon form 29. However, to advance the ribbon 29 over the bath of molten metal, to lift it therefrom and to convey it toward and through an annealing lehr it is necessary to "start the ribbon." This is done by allowing a so-called "bait," usually in the form of a cold metal bar, to adhere to the end of the ribbon 29 on the metal bath and to then withdraw the bait. This causes the ribbon, following the bait, to advance over and lift off of the molten bath as the bait is dragged over the regular ribbon withdrawing and conveying means for a distance sufficient to set up the tractive force necessary to insure the ribbon's continuing to move toward or into and through the annealing lehr. At this point, the ribbon can be cut from the bait and the bait removed to allow the ribbon to move thereafter in its normal, continuous manner.

It will be obvious from the foregoing that the dragging of the bait over the regular ribbon conveying means, which includes the lift rolls, as the ribbon is started creates a considerable risk of injury to and contamination of the surfaces of the conveying means by passage of the bait thereover. Even more danger is presented by the fact that, before the bait can be employed to start the ribbon it must be fed backward over all of that portion of the conveying means upon which it must move in starting the ribbon in order to bring the bait into position to adhere it to the ribbon to be started. Also cables, chains or the like must be used to both feed and withdraw the bait and at least portions of these also pass or are dragged over and in contact with the conveying means.

A similar possibility of injury to or contamination of the regular conveying means for the continuous ribbon and especially the lift rolls arise during periods when, for one reason or another, bad undersurface is being produced on the ribbon. This may be caused by impurities or foreign matter adhered to or embedded in the undersurface of the ribbon or may be from some other cause which merely creates a roughened and uneven undersurface. In any event, whatever the cause, and however the defect is manifested, such a period of bad undersurface production gives rise to conditions which may injure or contaminate the ribbon lifting and conveying means.

However, according to the present invention, it has been found that risks of injury to and contamination of the surfaces of the lifting and conveying rolls from conditions such as just described can be largely overcome, without interrupting the movement of or breaking the ribbon, by the provision of protecting and auxiliary supporting means associated with the lift rolls and/or any other conveyor element that is liable to injury or contamination therefrom.

One of the simplest forms of protecting and auxiliary supporting apparatus contemplated by the invention is depicted in FIGS. 2 to 4 of the drawings and as there shown consists of a plate 34 which may be of stainless steel or other material designed to give a smooth, highly polished upper surface 35. This plate 34 is normally located to one side of the lift rollers 30 and 31 (FIG. 2)

and, in practicing the invention with this plate it is only necessary to slide the plate inwardly over the rolls 30 and 31 to interpose it between them and the glass ribbon 29.

To facilitate this procedure and to guide the plate 34 in its proper path guides 36 may be secured to the undersurface of the plate and a series of rollers 37 mounted in position to receive the guides during movement of the plate 34 into and out of operative position. It will be noted that the rollers 37 are mounted at a height which insures that the plate 34 will be spaced a sufficient distance above the rolls 30 and 31 to prevent contact therewith as the plate is being slid in and out of position. This spacing also makes it possible, where desired, to continue to rotate the rolls 30 and 31 with the plate 34 in place which facilitates cleaning or other treatment of the rolls at this time.

In situations where the plate 34 is to be used to protect the rolls 30 and 31 during the production of bad undersurface, the plate 34 is merely slid laterally into operative position between the rolls 30 and 31 and the ribbon 29 as described above and maintained there until the conditions which have caused the bad undersurface are corrected. Since this use of the plate 34 involves sliding it laterally between the rolls 30 and 31 and the ribbon 29 while the latter is in continuous motion a curved and rounded end portion is provided as shown at 38 on that portion of the plate that first engages the ribbon between the rolls 30 and 31.

On the other hand, where the plate 34 is to be employed to protect the rolls 30 and 31 during starting of a ribbon, the plate may be moved into operative position when there is no ribbon of glass being withdrawn from the molten metal bath. Conversely, however, it may sometimes be found desirable to move the plate 34 into operative position as first described during the final period of withdrawing one ribbon from the molten metal bath so that it will be in position to protect the rolls as the old sheet ends and ready to protect them during the subsequent starting of a new one.

Figure 5:
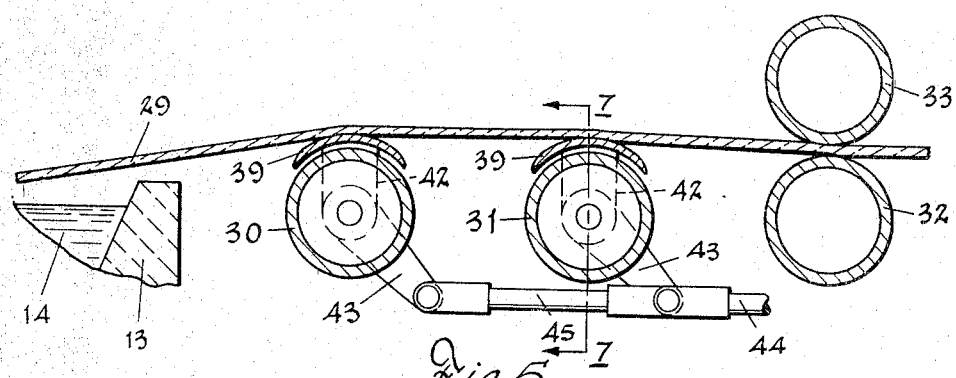
FIG. 5 is a view similar to FIG. 3 but showing a modified form of auxiliary support means.
Figure 6:
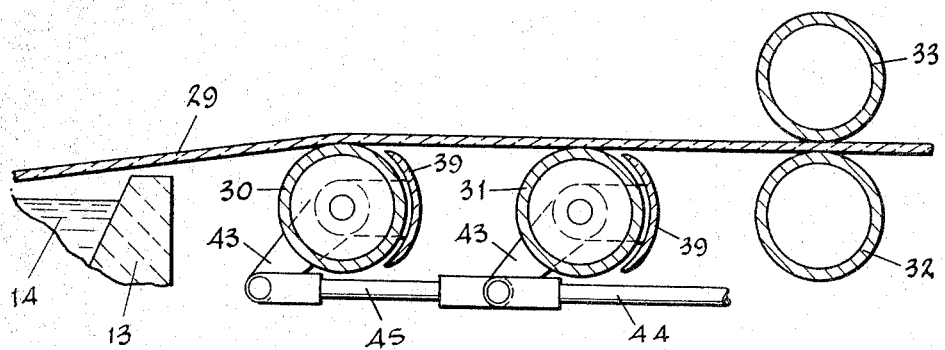
FIG. 6 is a view similar to FIG. 5 but with the auxiliary support means out of operative position.
Figure 7:
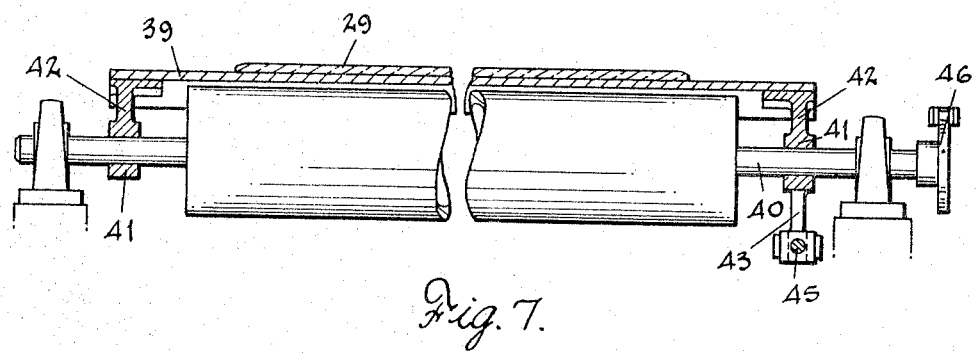
FIG. 7 is a fragmentary, sectional view taken substantially along the line 7—7 in FIG. 5, showing the means for moving the auxiliary supporting means into and out of operative position.

A modified form of the protecting and auxiliary supporting means of the invention is shown in FIGS. 5 to 7. This consists of arcuately shaped plates 39 mounted on the shafts 40 of the rollers 30 and 31 and for swinging movement thereabout by means of sleeves 41 and arms 42. The rolls 30 and 31 are keyed to their respective shafts 40 while the sleeves 41 are freely rotatable thereon and are provided with dependent lever arms 43 adapted to be operated in unison by a connecting rod 44 and links 45. Upon movement of the rod 44 to the left or right (FIG. 5) the arcuate plates 39 will be moved relative to and parallel with the circumference of rolls 30 and 31 with which they are associated.

The normal or inoperative position of the plates 39 is shown in FIG. 6 and they can be moved simultaneously from this position into the operative position shown in FIG. 5 by sliding the connecting rod 44 to the right and can subsequently be simultaneously returned to their inoperative position by sliding the connecting rod in the opposite direction.

Any of the rolls 30 to 33 as well as subsequent conveyor rolls (not shown) can be driven at the same peripheral speed by any suitable means such as the chain and sprocket drive indicated at 46 to provide the necessary tractive force to the glass ribbon 29; and it will be obvious that specifically different types of protecting and supporting means can be used in practicing this invention.

Indeed, it is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. In apparatus for producing flat glass the combination, with a tank for containing a bath of molten metal upon which a layer of molten glass that is free to flow laterally can develop into a buoyant body of molten glass of stable thickness, and means for withdrawing said body of stable thickness in ribbon form from said molten metal bath and conveying the same in a generally horizontal path, of movable protecting and auxiliary supporting means, and means for positioning said movable means between said withdrawing and conveying means and said ribbon.

2. Apparatus as defined in claim 1 in which said movable protecting and auxiliary supporting means is a plate.

3. Apparatus as defined in claim 2 in which the means for positioning said plate includes means for moving it into and out of operative position.

4. Apparatus as defined in claim 1 in which said movable protecting and auxiliary supporting means is a substantially flat plate, and said means for positioning the same includes means for guiding and supporting said plate for lateral movement relative to the path of said ribbon.

5. Apparatus as defined in claim 1 in which said withdrawing and conveying means are rolls, said movable protecting and auxiliary supporting means is an arcuately shaped plate, and the means for positioning the same includes means for swinging said plate into and out of operative position over one of said rolls.

References Cited by the Examiner

UNITED STATES PATENTS

| | | | |
|---|---|---|---|
| 710,357 | 9/1902 | Heal | 65—65 |
| 1,447,647 | 3/1923 | Crowley et al. | 65—169 |
| 3,083,551 | 4/1963 | Pilkington | 65—65 |

DONALL H. SYLVESTER, *Primary Examiner.*

S. LEON BASHORE, G. R. MYERS,

*Assistant Examiners.*